Jan. 5, 1926.
W. HENRICKS
STALK CUTTER
Filed Nov. 21, 1924
1,568,604
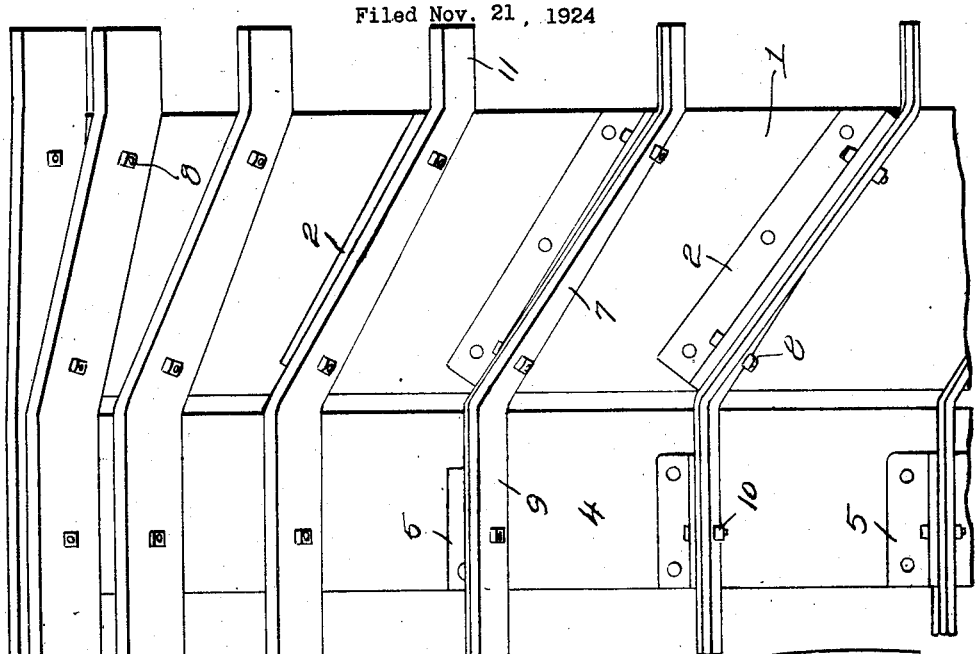
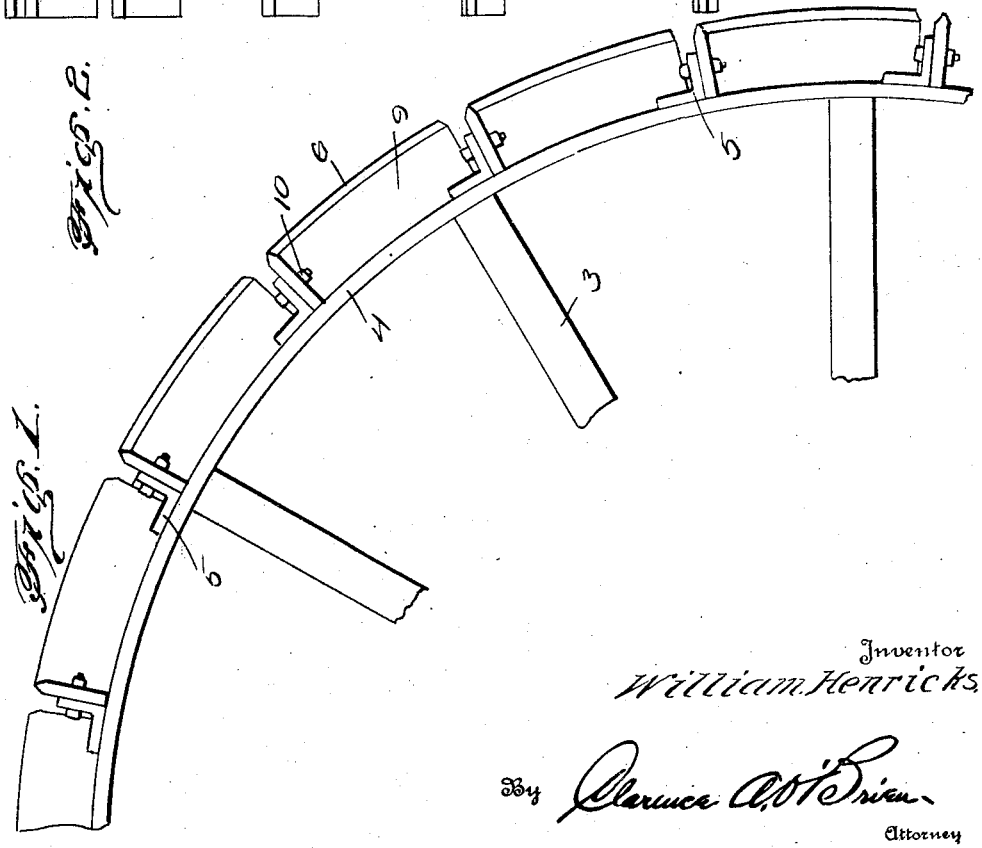
Inventor
William Henricks
By Clarence A. O'Brien
Attorney Patented Jan. 5, 1926.

1,568,604

UNITED STATES PATENT OFFICE.

WILLIAM HENRICKS, OF PHARR, TEXAS.

STALK CUTTER.

Application filed November 21, 1924. Serial No. 751,316.

*To all whom it may concern:*

Be it known that I, WILLIAM HENRICKS, a citizen of the United States, residing at Pharr, in the county of Hidalgo and State of Texas, have invented certain new and useful Improvements in Stalk Cutters, of which the following is a specification.

This invention relates to improvements in stalk cutters and has for its principal object to provide a simple and efficient means which is adapted to be associated with one of the drive wheels of a tractor, which operates forwardly of a plow, so that growing stalks may be chopped down, when the tractor goes forwardly over the soil.

Another important object of the invention is to provide a stalk cutter of the above mentioned character, which may be readily and easily attached on the tractor wheel, without necessitating any material alteration of the tractor wheels, the device being simple in construction, inexpensive, strong and durable, and further well adapted for the purposes for which it is designated.

A further object is to provide an attachment of the above mentioned character, which is adapted to serve in the capacity of a stalk cutter and also a soil pulverizer, the weight of the tractor wheel with which the attachment is associated, causing the blades to enter the soil.

Other objects and advantages of this invention will become apparent during the course of the following description.

In the accompanying drawings, forming a part of this specification, and in which like numerals designate like parts throughout the same:

Figure 1 is a fragmentary side elevation of the extension wheel, showing the manner in which the outer ends of the cutter blades are secured to the lugs arranged on the rim of the wheel, and Figure 2 is a top plan view of a tractor wheel and the extension wheel, showing the cutter blade extending across the rim of the wheel.

In the drawing, wherein for the purpose of illustration is shown the preferred embodiment of my invention, the numeral 1 designates the rim of a tractor wheel, to which is connected a plow or other agricultural implement (not shown), the tractor being adapted to provide a means whereby the agricultural implement may be moved along the ground, for the purposes well known in the art. Secured on the rim 1 of the tractor wheel are the spaced diagonally extending angle iron lugs 2. Adapted to be detachably associated with the tractor wheel, in any suitable manner is the extension wheel 3, the rim 4 thereof being adapted to lie flush with the rim 1 of the tractor wheel. Angle iron lugs 5, similar to the angle iron lugs 2 are secured in spaced relation on the rim 4 of the extension wheel 3 and the same extend transversely thereon, in a manner as more clearly illustrated in Figure 2. The lugs are arranged on the extension wheel in cooperative relation with the lugs on the tractor wheel, for the purposes to be presently described. A series of cutter blades are adapted to be detachably associated with each pair of cooperating lugs on the rims of the tractor wheel and the extension wheel, and each blade 6 has its intermediate portion 7 secured to the outstanding portion of each of the lugs 2 by the fastening bolts 8. The outer end 9 of each of the blades 6 is bent at an angle with respect to the intermediate portion 7, so as to fit substantially flush against the outstanding portion of the adjacent lug 5 arranged on the rim 4 on the extension wheel 3, and a fastening bolt 10 provides a securing means for the outer ends of the cutter blades, and the respective outstanding portions of the lugs 5. The inner ends of the cutter blades are also bent at an angle with respect to the intermediate portion 7, and the inner ends 11 of each of the blades 6 extend beyond the inner peripheral edge of the rim 1. In a similar manner, the outer end of each blade extends beyond the outer edge of the rim of the extension wheel 3. This construction is clearly illustrated in Figure 2. As is further illustrated in Figure 1, the cutting edges of the blades extend beyond the outer edge of the outstanding portions of the lugs, so that when the tractor moves along the ground, the cutting edges of the blade will sever the stalks and the weight of the tractor wheel will cause the blades to enter the soil. The blades entering the soil will break up the clogs and also tend to pulverize the soil. This will place the soil in condition to be operated upon to advantage by the plow or harrow attached to the rear of the tractor.

The simplicity with which my improved stalk cutter is constructed enables the same to be readily and easily attached on a drive wheel of a tractor and will, at all times, be positive and efficient in carrying out the purposes for which the same is designated.

While I have shown the preferred embodiment of my invention, it is to be understood that various changes in the size, shape and arrangement of parts may be made without departing from the spirit of the invention and the scope of the appended claim.

Having thus described my invention, what I claim is:

In combination with a tractor wheel and the usual traction lugs secured on the rim thereof, said lugs being disposed diagonally on said rim, of an extension wheel adapted to be secured on one side of the tractor wheel, the rim of the extension wheel being flush with the aforementioned rim, lugs secured on the rim of the extension wheel, said lugs being arranged transversely on the rim and adapted for cooperation with the adjacent lugs of the first mentioned rim, and cutter blades extending across the rims and secured to said lugs, whereby the portion of each blade disposed across the rim of the tractor wheel will extend diagonally thereon, while the portion of each blade disposed across the rim of the extension wheel will extend transversely.

In testimony whereof I affix my signature.

WILLIAM HENRICKS.